United States Patent Office 3,394,084
Patented July 23, 1968

3,394,084
RARE EARTH ACTIVATED INDIUM BORATE CATHODOLUMINESCENT PHOSPHORS
Frank J. Avella, Flushing, N.Y., assignor to General Telephone and Electronics Laboratories, Inc., a corporation of Delaware
No Drawing. Filed Aug. 30, 1965, Ser. No. 483,788
11 Claims. (Cl. 252—301.4)

ABSTRACT OF THE DISCLOSURE

Cathodoluminescent phosphors comprising indium borate activataed with an element selected from the group consisting of terbium, europium, dysprosium and samarium. These phosphors are useful in display devices such as radar and color television receivers.

---

This invention relates to cathodoluminescent phosphors and in particular to phosphors composed of indium borate activated by selected elements of the lanthanide series.

Phosphors which emit colored light when excited by an electron beam are widely used in cathode ray tubes of the type employed in radar and color television receivers, oscilloscopes and similar display devices. In general, it is desirable that these phosphors emit as much light as possible with a given excitation and have a chromaticity and persistance which is compatable with the desired application. I have discovered a group of phosphors which combine excellent brightness with other characteristics making them suitable for use in cathode ray tubes, particularly those used in radar and in color television displays.

The subject phosphors consist essentially of indium borate activated with sufficient terbium, europium, dysporsium or samarium to make the resultant material cathodoluminescent. More specifically, I have found that when indium borate is activated with between 0.001 and 0.07 gram atom of terbium, green cathodoluminescence is obtained and when activated with between 0.005 and 0.09 gram atom of europium, red cathodoluminescence results. Expressing indium borate by the formula $$In(BO_3)_x$$

best results are obtained when the host material is stoichiometric ($x=1.00$) but satisfactory phosphors are obtained when $x$ is varied between 0.95 and 1.05.

The phosphors may be prepared by several methods. In one method, dry powders of indium oxide $IN_2O_3$, boric acid $H_3BO_3$ and an oxide selected from the group terbium oxide $Tb_2O_3$, europium oxide $Eu_2O_3$, dysprosium oxide $Dy_2O_3$ and samarium oxide $Sm_2O_3$ are blended together and then placed in a refractory crucible. Preferably the crucible is made of quartz although platinum and aluminum oxide have also been used successfully. If desired, the crucible may be covered to inhibit evaporation of boric oxide $B_2O_3$. The mixture is subjected to several firings in air at successively higher temperatures, the charge being mortared after each firing to insure homogeneity. While the firing conditions are not critical and are dictated to a large extent by the batch size, the final firing should be in the range 1200 to 1500° C. with 1400° C. being optimal. The duration of firing may be between ½ and 15 hours, but one hour is preferred.

In another method of preparing the phosphor the starting materials $In_2O_3$, $H_3BO_3$ and the oxide of the activator terbium Tb, europium Eu, dysprosium Dy or samarium Sm are dissolved in nitric acid, the solution evaporated to dryness and then fired as described above. Alternatively, the blend of dry materials can be mixed with a flux such as sodium tetraborate ($Na_2B_4O_7 \cdot 10H_2O$) and this mixture fired at a temperature of about 400° C. until the water is removed. The mixture is then refired at a temperature in the range 1200–1400° C. for approximately 5 hours. The flux is removed by leaching with water or an aqueous solution such as dilute hydrochloric acid or a dilute alkali.

While the methods described above produce satisfactory phosphors, it has been found that further improvement may be obtained by agitating the fired material in a hot 10% hydrochloric acid solution for about 30 minutes and then washing to a neutral pH with water.

This brief introduction to the present invention will be more fully understood and its advantages will become more apparent from the following examples.

Example I

A sample of terbium activated indium borate having the formulation $In_{0.98}Tb_{0.02}BO_3$ was prepared as follows:

2.20 grams $In_2O_3$, 0.0592 gram $Tb_2O_3$ and 1.00 gram $H_3BO_3$ were dry-blended and placed in a 20 milliliter platinum crucible. After covering with a platinum lid, the crucible containing the sample was placed in an electric resistance furnace at room temperature. The temperature of the furnace was raised to 400° C. in an atmosphere of air and held for one hour. The sample was then removed from the furnace, cooled, mortared to insure homogeneity, placed in the same crucible and returned to the 400° C. furnace. The temperature of the furnace was next raised to 1000° C. where it was maintained for one hour. The cooling and mortaring process was then repeated and the sample returned to the furnace after which the furnace temperature was raised to 1400° C. and held there for one hour. At the end of hour, the phosphor powder was removed from the furnace and lightly mortared to break up aggregates. Then the powder was slurried in boiling 10% HCL for about 30 minutes washed by decantation with boiling water until its pH was neutral and finally dried at about 110° C.

The body color of the resulting phosphor is cream or very light yellow. Under excitation by an electron beam the phosphor emits green light having C.I.E. chromaticity coordinates $x=0.330$, $y=0.624$. The luminosity of $$In_{0.98}Tb_{0.02}BO_3$$

under cathode ray excitation is about 65% that of (ZnCd)S:Ag but is about 5% brighter than that of another known cathodoluminescent phosphor $$Zn_2SiO_4:Mn.$$

The emission color of terbium activated indium borate does not shift during firing in contrast to (ZnCd)S:Ag which is subject to uncontrollable color shifts during heat treatment. [In the (ZnCd)S:Ag phosphor used as a standard of comparison the ratio of zinc sulfide to cadmium sulfide was about 2.33 to 1 and the percent of silver activation approximately 0.01.] The time required for the terbium activated indium borate phosphor to decay to $1/e$ of its initial brightness after removal of cathode ray excitation is 6 to 7 milliseconds and $\frac{1}{10}$ of its initial brightness about 15 milliseconds.

The average size of the phosphor particles obtained from the above process is about 8 microns. If desired, the particle size can be increased to as much as 15 microns by cooling the sample from 1400° C. to 1200° C. after the finaal firing at a rate of approximately 15° C. per hour.

Example II

The process of Example I was repeated to produce several samples of indium borate activated by various amounts of terbium. Expressing the phosphor formula as $In_{1-y}Tb_yBO_3$, the amount of terbium $y$ was varied to determine the range in which cathodoluminescene is achieved. Cathodoluminescence was obtained in the range $y=0.001$ to $y=0.07$ with best results between 0.02 and 0.03. Table I gives the quantities of the ingredients mixed for each phosphor composition together with the gram atoms of terbium $y$ and the brightness of the phosphor expressed as a percentage of that obtained when indium borate is activated with 0.02 gram atom of terbium. The C.I.E. color coordinates and decay characteristics given in Example I were substantially the same for all of the samples tested in Table I.

TABLE I

| Initial Ingredients | | | $In_{1-y}Tb_yBO_3$ | |
| --- | --- | --- | --- | --- |
| $In_2O_3$ (grams) | $Tb_2O_3$ (grams) | $H_3BO_3$ (grams) | y (gram atoms) | Relative Brightness |
| 2.25 | 0.0030 | 1.00 | 0.001 | 23 |
| 2.24 | 0.0148 | 1.00 | 0.005 | 71 |
| 2.23 | 0.0296 | 1.00 | 0.010 | 91 |
| 2.20 | 0.0592 | 1.00 | 0.020 | 100 |
| 2.18 | 0.0888 | 1.00 | 0.030 | 100 |
| 4.27 | 0.296 | 2.00 | 0.050 | 84 |
| 4.18 | 0.414 | 2.00 | 0.070 | 82 |

Example III

The process described in Examples I and II was repeated except that the indium borate was activated with europium rather than terbium. Using red-emitting yttrium vanadate activated with 0.05 gram atom of europium as a standard, it was found that the europium activated indium borate emitted red light and that the luminous intensity of the brightest material $In_{.97}Eu_{.03}BO_3$ is about 180% that of the standard. Table II gives the quantities of $In_2O_3$, $Eu_2O_3$ and $H_3BO_3$ together with the gram atoms of europium activation in the phosphor and the relative brightness as compared with that obtained when the indium borate is activated with 0.03 gram atom of europium.

TABLE II

| Initial Ingredients | | | $In_{1-y}Eu_yBO_3$ | |
| --- | --- | --- | --- | --- |
| $In_2O_3$ (grams) | $Eu_2O_3$ (grams) | $H_3BO_3$ (grams) | y (gram atoms) | Relative Brightness |
| 1.68 | 0.0107 | 0.750 | 0.005 | 73 |
| 1.67 | 0.0214 | 0.750 | 0.010 | 89 |
| 1.63 | 0.0641 | 0.750 | 0.030 | 100 |
| 1.57 | 0.149 | 0.750 | 0.070 | 90 |
| 1.53 | 0.192 | 0.750 | 0.090 | 84 |

The C.I.E. coordinates for all samples of $In_{1-y}Eu_yBO_3$ are approximately $x=0.597$, $y=0.403$ and the body color and persistance are the same as given for $In_{1-y}Tb_yBO_3$ in Example I.

Example IV

In addition to showing strong cathodoluminescence, europium activated indium borate exhibits a moderate response to ultraviolet excitation. The response of terbium activated indium borate to ultraviolet excitation was considerably weaker but it was found that the response could be improved by the addition of sodium tetraborate to the blend and by a modified firing procedure.

Improved response to ultraviolet excitation may also be obtained by mixing the $In_2O_3$, $Tb_2O_3$ and $H_3BO_3$ with between 0.001 and 0.02 gram atom of an element selected from the group consisting of sodium, gadolinium, silicon and bismuth, and then proceeding as in Example I.

A sample of terbium activated indium borate having improved response to ultraviolet excitation was prepared by dry-blending 7.70 grams of $Na_2B_4O_7 \cdot 10H_2O$ with 5.1 grams $In_2O_3$, 0.148 gram $Tb_2O_3$ and 2.50 grams $H_3BO_3$. The material was processed as in Example I except that four firing steps of approximately 200° C., 950° C., 1200° C. and 1400° C. were employed. After firing, the flux was removed by washing in a dilute solution of hydrochloric acid. Another result of this procedure was an improvement in the crystallinity and an increase in the particle size of the indium borate phosphor powder.

Example V

Attempts were made to obtain cathodoluminescence by activating indium borate with other elements of the lanthanide series including dysprosium, samarium, holmium, erbium, and thulium. It was found that the dysprosium activated indium borate exhibited some orange cathodoluminescence and that the samarium activated material gave weak red cathodoluminescence. The other lanthanide activators did not produce cathodoluminescence in the indium borate host.

$In_{.99}Dy_{.01}BO_3$ was prepared by the process of Example I except that 1.11 grams of $In_2O_3$, 0.0151 gram $Dy_2O_3$ and 0.500 gram $H_3BO_3$ were used and the firing was conducted in five steps of 400° C., 700° C., 1000° C., 1200° C. and 1400° C. In $_{.99}Sm_{.01}BO_3$ was prepared in exactly the same manner as the $In_{.99}Dy_{.01}BO_3$ except that 0.0141 gram of $Sm_2O_3$ was employed.

Example VI

Samples of $In_{.98}Tb_{.02}BO_3$ and $In_{.97}Eu_{.03}BO_3$ were prepared in accordance with the method of Example I. Equal molar amounts of sodium tetraborate was then added to each of the phosphors and these were refired in air at approximately 1200° C. for about 2 hours. The resulting phosphor was brighter under ultraviolet excitation than the phosphor prepared by the method of Example I and also had improved crystallinity.

While typical examples have been illustrated and described in detail, it is to be understood that all matter contained therein shall be interpreted as illustrative and not in a limiting sense.

What is claimed is:

1. A cathodoluminescent phosphor consisting essentially of indium borate activated with an element selected from the group consisting of terbium, europium, dyprosium and samarium, the amount of said activating element being sufficient to render said indium borate cathodoluminescent.

2. A cathodoluminescent phosphor consisting essentially of indium borate activated with an element selected from the group consisting of terbium and europium, the amount of said activating element being sufficient to render said indium borate cathodiluminescent.

3. A green-emitting cathodluminescent phosphor consisting essentially of indium borate activated with between 0.001 and 0.07 gram atom of terbium.

4. A green-emitting cathodluminescent phosphor consisting essentially of indium borate activated with approximately 0.02 gram atom of terbium.

5. A red-emitting cathodluminescent phosphor consisting essentially of indium borate activated with between 0.005 and 0.09 gram atom of europium.

6. A red-emitting cathodluminescent phosphor consisting essentially of indium borate activated with approximately 0.03 gram atom of europium.

7. An orange-emitting cathodoluminescent phosphor consisting essentially of indium borate activated with approximately 0.01 gram atom of dysprosium.

8. A red-emitting cathodluminescent phosphor consisting essentially of indium borate activated with approximately 0.01 gram atom of samarium.

9. The method of making a cathodoluminescent phosphor of increased particle size and improved crystallinity comprising the steps of
  (a) blending indium oxide, boric acid, and an oxide of an activator selected from the group consisting of terbium, europium, dysprosium and samarium with a sodium tetraborate flux,
  (b) firing said mixture in air at a temperature in the range 1200° C. to 1400° C., and
  (c) removing said flux by washing the resulting phosphor in an aqueous solution.

10. The method of making cathodoluminescent terbium activated indium borate having increased particle size and improved crystallinity comprising the steps of (a) blending indium oxide, boric acid and terbium oxide with a sodium tetraborate flux, (b) firing said mixture in air a plurality of times, the last of said firings being at a temperature of approximately 1400° C. for about 5 hours, and (c) removing said flux by washing the resulting phosphor in a dilute solution of hydrochloric acid.

11. The method of making a cathodoluminescent phosphor comprising the steps of (a) blending indium oxide, boric acid, and an oxide of an activator selected from the group consisting of terbium and europium, (b) firing said mixture in air successively at 400° C., 1000° C. and 1400° C., (c) slurrying the resulting phosphor in hot dilute hydrochloric acid, (d) adding an equal molar amount of sodium tetraborate to the phosphor, (e) firing the mixture at approximately 1200° C. for about 2 hours, and (f) removing said sodium tetraborate by washing the resulting phosphor in a dilute solution of hydrochloric acid.

References Cited

UNITED STATES PATENTS 3,294,701  12/1968  Vogel et al. _____ 252—301.4

TOBIAS E. LEVOW, *Primary Examiner.*

ROBERT D. EDMONDS, *Assistant Examiner.*